(12) United States Patent
Kao et al.

(10) Patent No.: US 11,227,084 B2
(45) Date of Patent: Jan. 18, 2022

(54) MULTI-BIT STANDARD CELL

(71) Applicant: TAIWAN SEMICONDUCTOR MANUFACTURING COMPANY LTD., Hsinchu (TW)

(72) Inventors: Jerry Chang Jui Kao, Taipei (TW); Hui-Zhong Zhuang, Kaohsiung (TW); Yung-Chen Chien, Hsinchu (TW); Ting-Wei Chiang, New Taipei (TW); Chih-Wei Chang, Hsinchu (TW); Xiangdong Chen, San Diego, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 103 days.

(21) Appl. No.: 16/522,586

(22) Filed: Jul. 25, 2019

(65) Prior Publication Data
US 2020/0151297 A1   May 14, 2020

Related U.S. Application Data

(60) Provisional application No. 62/767,404, filed on Nov. 14, 2018.

(51) Int. Cl.
*G06F 30/30* (2020.01)
*G06F 30/392* (2020.01)
*G06F 30/394* (2020.01)
*G06F 30/327* (2020.01)
*H01L 25/00* (2006.01)
*H03K 19/00* (2006.01)

(52) U.S. Cl.
CPC ............ *G06F 30/30* (2020.01); *G06F 30/392* (2020.01); *H01L 25/00* (2013.01); *G06F 30/327* (2020.01); *G06F 30/394* (2020.01); *H03K 19/00* (2013.01)

(58) Field of Classification Search
CPC ...... G06F 30/30; G06F 30/392; G06F 30/327; G06F 30/394; H01L 25/00; H03K 19/00
USPC ...... 716/104, 119, 126; 703/15; 326/47, 101
See application file for complete search history.

(56) References Cited

U.S. PATENT DOCUMENTS

| | | | | |
|---|---|---|---|---|
| 5,119,314 A | * | 6/1992 | Hotta | G06F 30/39 716/104 |
| 5,378,904 A | * | 1/1995 | Suzuki | H01L 27/0207 257/208 |
| 5,506,788 A | * | 4/1996 | Cheng | H01L 27/0207 716/123 |
| 5,603,023 A | * | 2/1997 | Machida | G06F 7/24 |
| 5,812,417 A | * | 9/1998 | Young | G06F 30/30 716/104 |

(Continued)

*Primary Examiner* — Phallaka Kik
(74) *Attorney, Agent, or Firm* — WPAT, P.C., Intellectual Property Attorneys; Anthony King

(57) ABSTRACT

A multi-bit standard cell embodied on a non-transitory computer-readable medium includes: a first logic cell with a first logic cell height measured from a first lower boundary to a first upper boundary of the first logic cell; and a second logic cell with a second logic cell height measured from a second lower boundary to a second upper boundary of the second logic cell, the second logic cell height different from the first logic cell height, and the second upper boundary attached to the first lower boundary. The first logic cell is arranged to perform a first logical function, the second logic cell is arranged to perform a second logical function, and the first logical function is the same as the second logical function.

20 Claims, 14 Drawing Sheets

(56) References Cited

U.S. PATENT DOCUMENTS

| | | | | |
|---|---|---|---|---|
| 6,320,410 | B1* | 11/2001 | Malhotra | H03K 19/17796 |
| | | | | 326/38 |
| 6,539,530 | B1* | 3/2003 | Torii | G06F 30/394 |
| | | | | 716/127 |
| 6,650,142 | B1* | 11/2003 | Agrawal | H03K 19/17728 |
| | | | | 326/39 |
| 6,848,095 | B1* | 1/2005 | Lee | G06F 30/34 |
| | | | | 716/117 |
| 7,539,963 | B2* | 5/2009 | Ema | H01L 27/105 |
| | | | | 716/104 |
| 2002/0038204 | A1* | 3/2002 | Yonemori | G06F 30/394 |
| | | | | 703/19 |
| 2002/0184584 | A1* | 12/2002 | Taniguchi | G01R 31/318555 |
| | | | | 714/726 |
| 2003/0084417 | A1* | 5/2003 | Baba | G06F 30/39 |
| | | | | 716/113 |
| 2003/0188266 | A1* | 10/2003 | Croce | G06F 30/30 |
| | | | | 716/113 |
| 2004/0013016 | A1* | 1/2004 | Yamazaki | G11C 29/56012 |
| | | | | 365/201 |
| 2007/0157146 | A1* | 7/2007 | Chen | G06F 30/392 |
| | | | | 257/798 |
| 2008/0073673 | A1* | 3/2008 | Shiga | H01L 27/11807 |
| | | | | 257/211 |
| 2008/0216026 | A1* | 9/2008 | Gotou | G06F 30/39 |
| | | | | 716/132 |
| 2010/0026341 | A1* | 2/2010 | Kuenemund | G06F 7/506 |
| | | | | 326/41 |
| 2017/0033070 | A1* | 2/2017 | Betsui | H01L 24/17 |
| 2017/0213026 | A1* | 7/2017 | Wu | G06F 21/76 |

* cited by examiner

MULTI-BIT STANDARD CELL

PRIORITY CLAIM AND CROSS-REFERENCE

This application claims the benefit of U.S. Provisional Application No. 62/767,404, filed on Nov. 14, 2018, the disclosure of which is hereby incorporated by reference in its entirety.

BACKGROUND

The architecture of a standard cell may have different cell heights for each cell row. This mix row cell architecture has speed similar to the architecture with higher cell height but area similar to the architecture with lower cell height. Although the mix row cell architecture has speed similar to the architecture with higher cell height and total area similar to the architecture with lower cell height, it is very challenging for the design automation tools to understand the mix row constraint and achieve balanced density of mixed rows, which can lead to low utilization, poor power and performance. Therefore, a novel architecture of circuit cell for improving the balance of cell architecture and APR (Automatic Place and Route) utilization is highly desirable in the field of IC (Integrated circuit) design.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
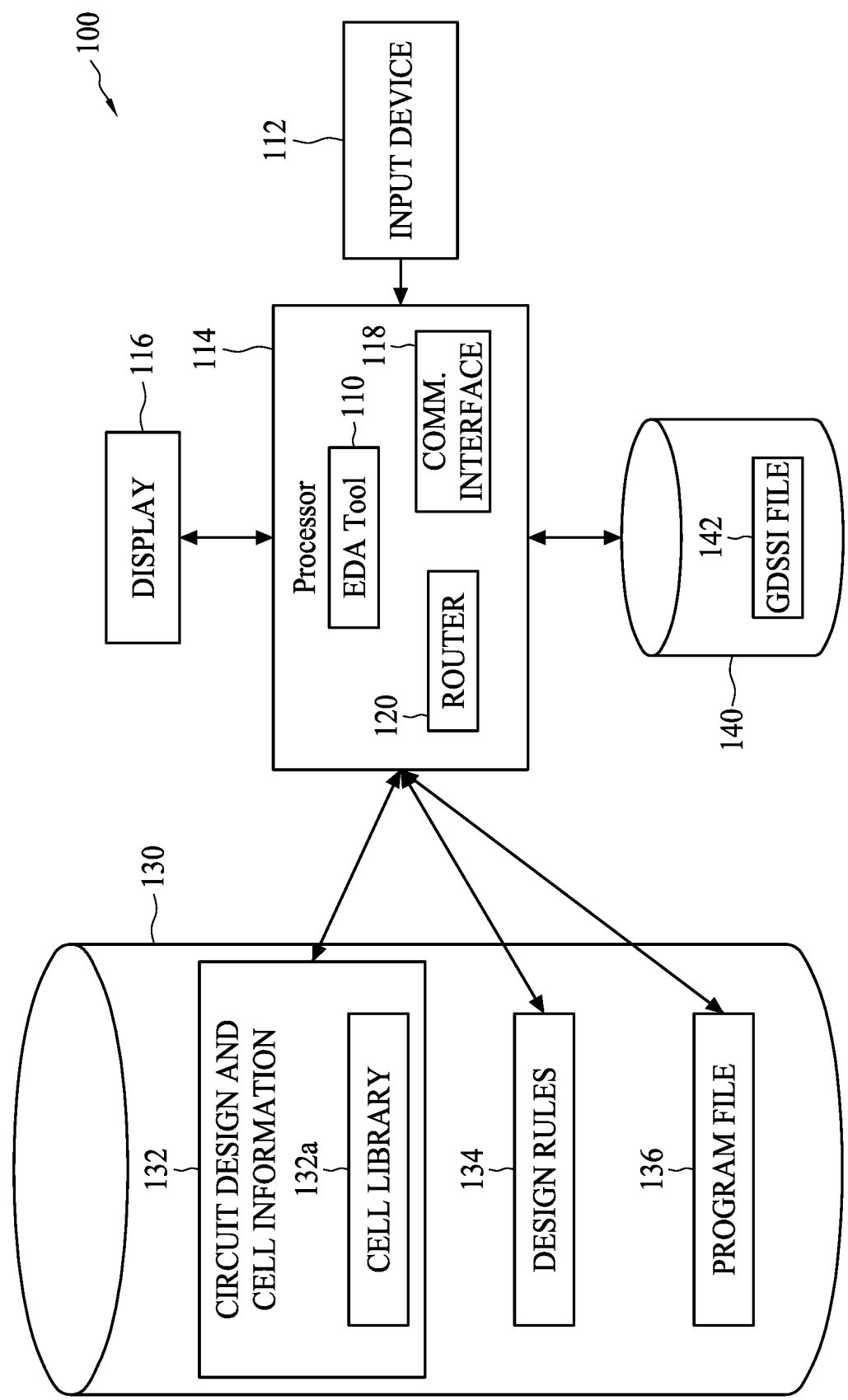
FIG. 1 is a diagram illustrating an electronic design automation system in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram illustrating an electronic design automation system 100 in accordance with some embodiments. As shown in FIG. 1, system 100 includes an electronic design automation ("EDA") tool 110 having a place and route tool including a chip assembly router 120.

The EDA tool 110 is a special purpose computer formed by retrieving stored program instructions 136 from a computer readable storage medium 130, 140 and executing the instructions on a general purpose processor 114. Processor 114 may be any central processing unit ("CPU"), microprocessor, micro-controller, or computational device or circuit for executing instructions. The non-transitory machine readable storage medium 130, 140 may be a flash memory, random access memory ("RAM"), read only memory ("ROM"), or other storage medium. Examples of RAMs include, but are not limited to, static RAM ("SRAM") and dynamic RAM ("DRAM"). ROMs include, but are not limited to, programmable ROM ("PROM"), electrically programmable ROM ("EPROM"), and electrically erasable programmable ROM ("EEPROM"), to name a few possibilities.

System 100 may include a display 116 and a user interface or input device 112 such as, for example, a mouse, a touch screen, a microphone, a trackball, a keyboard, or other device through which a user may input design and layout instructions to system 100. The one or more computer readable storage mediums 130, 140 may store data input by a user such as a circuit design and cell information 132, which may include a cell library 132 a, design rules 134, one or more program files 136, and one or more graphical data system ("GDS") II files 142.

EDA tool 110 may also include a communication interface 118 allowing software and data to be transferred between EDA tool 110 and external devices. Examples of a communications interface 118 include, but are not limited to, a modem, an Ethernet card, a wireless network card, a Personal Computer Memory Card International Association ("PCMCIA") slot and card, or the like. Software and data transferred via communications interface 118 may be in the form of signals, which may be electronic, electromagnetic, optical, or the like that are capable of being received by communications interface 118. These signals may be provided to communications interface 118 via a communications path (e.g., a channel), which may be implemented using wire, cable, fiber optics, a telephone line, a cellular link, a radio frequency ("RF") link and other communication channels.

Router 120 is capable of receiving an identification of a plurality of cells to be included in a circuit layout, including a list 132 of pairs of cells, selected from the cell library 132a, within the plurality of cells to be connected to each other. Design rules 134 may be used for a variety of processing technologies. In some embodiments, the design rules 134 configure the router 120 to locate connecting lines and vias on a manufacturing grid. Other embodiments may allow the router to include off-grid connecting lines and/or vias in the layout.

Figure 2:
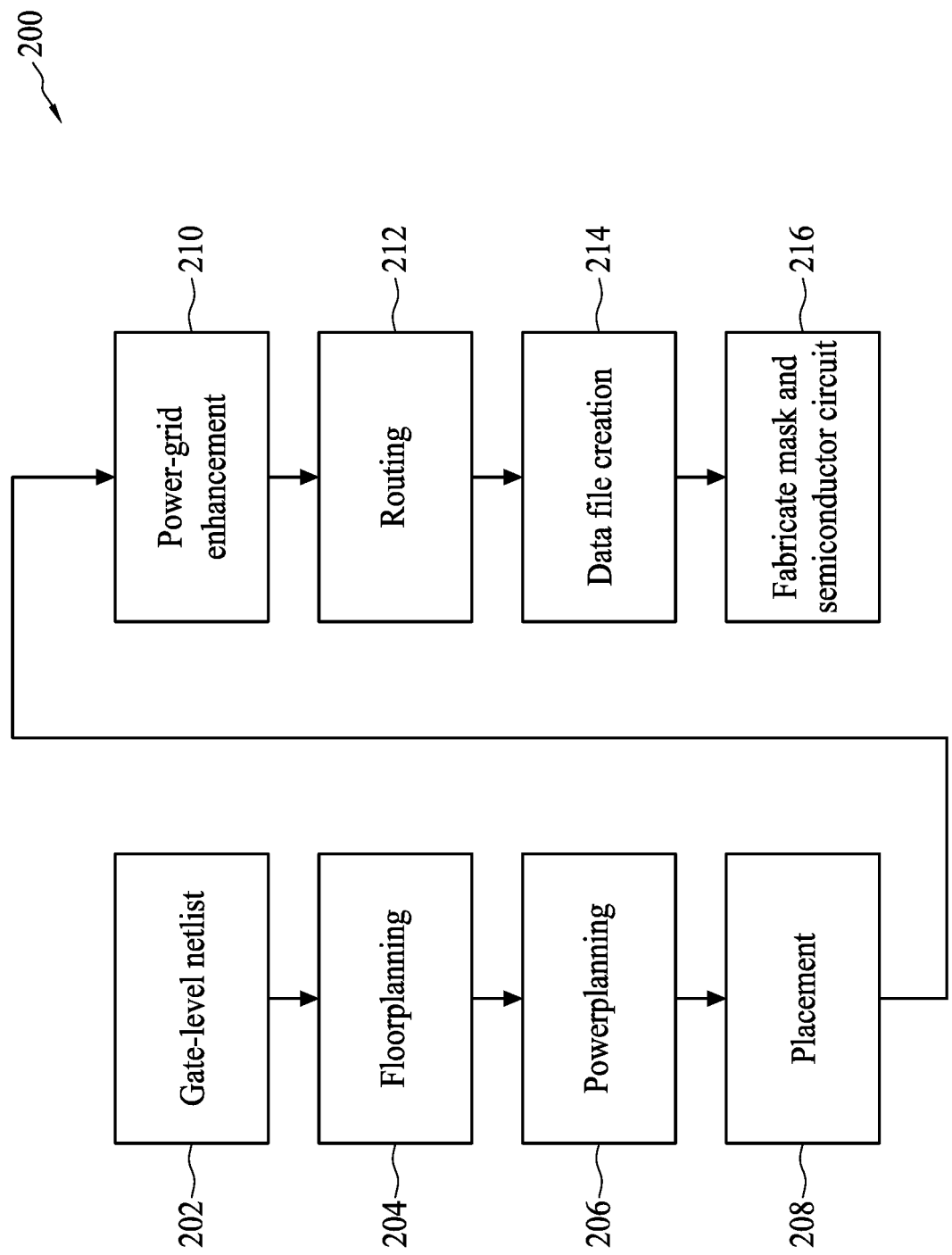
FIG. 2 is a flowchart illustrating a method of designing and fabricating a semiconductor-based circuit in accordance with some embodiments.

FIG. 2 illustrates one example of a method 200 of designing and fabricating a semiconductor-based circuit. In operation 202, a gate-level netlist is developed or extracted. As will be understood by one of ordinary skill in the art, the gate-level netlist can be extracted from circuit schematic by processor 114 of system 100.

In operation 204, floor planning for the semiconductor circuit is performed by system 100. In some embodiments, floor planning includes dividing a circuit into functional blocks, which are portions of the circuit, and identifying the layout for these functional blocks.

In operation 206, power planning for the semiconductor circuit is performed by system 100. Power planning includes identifying the power layout for the functional blocks of the semiconductor circuit. For example, the conductive traces for routing power and ground on the various conductive layers of the semiconductor circuit.

In operation 208, system 100 performs placement for the semiconductor circuit. According to some embodiments, the circuit placement includes determining the placement for the electronic components, circuitry, and logic elements. For example, the placement of the transistors, resistors, inductors, logic gates, and other elements of the semiconductor circuit are selected in operation 208.

In operation 210, system 100 performs power-grid enhancement.

In operation 212, the routings for the devices and semiconductor circuit are mapped. Routing in operation 212 is performed by router 120 of system 100.

In operation 214, a data file, such as a graphic database system ("GDS") II file, including data representing the physical layout of the circuit is generated and stored in a non-transient machine readable storage 140. As will be understood by one of ordinary skill in the art, the data file is used by mask making equipment, such as an optical pattern generator, to generate one or more masks for the circuit.

In operation 216, one or more masks for the semiconductor circuit are created based on the data file stored in operation 216. In some embodiments, the semiconductor circuit is fabricated using the masks in operation 216.

According to some embodiments, an APR (Automatic Place and Route) process may be performed in the operations 208~212. During the APR process, a layout of the semiconductor circuit (i.e. integrated circuit, IC) is generated automatically by the APR process by using the plurality of proposed standard cells.

Figure 3:
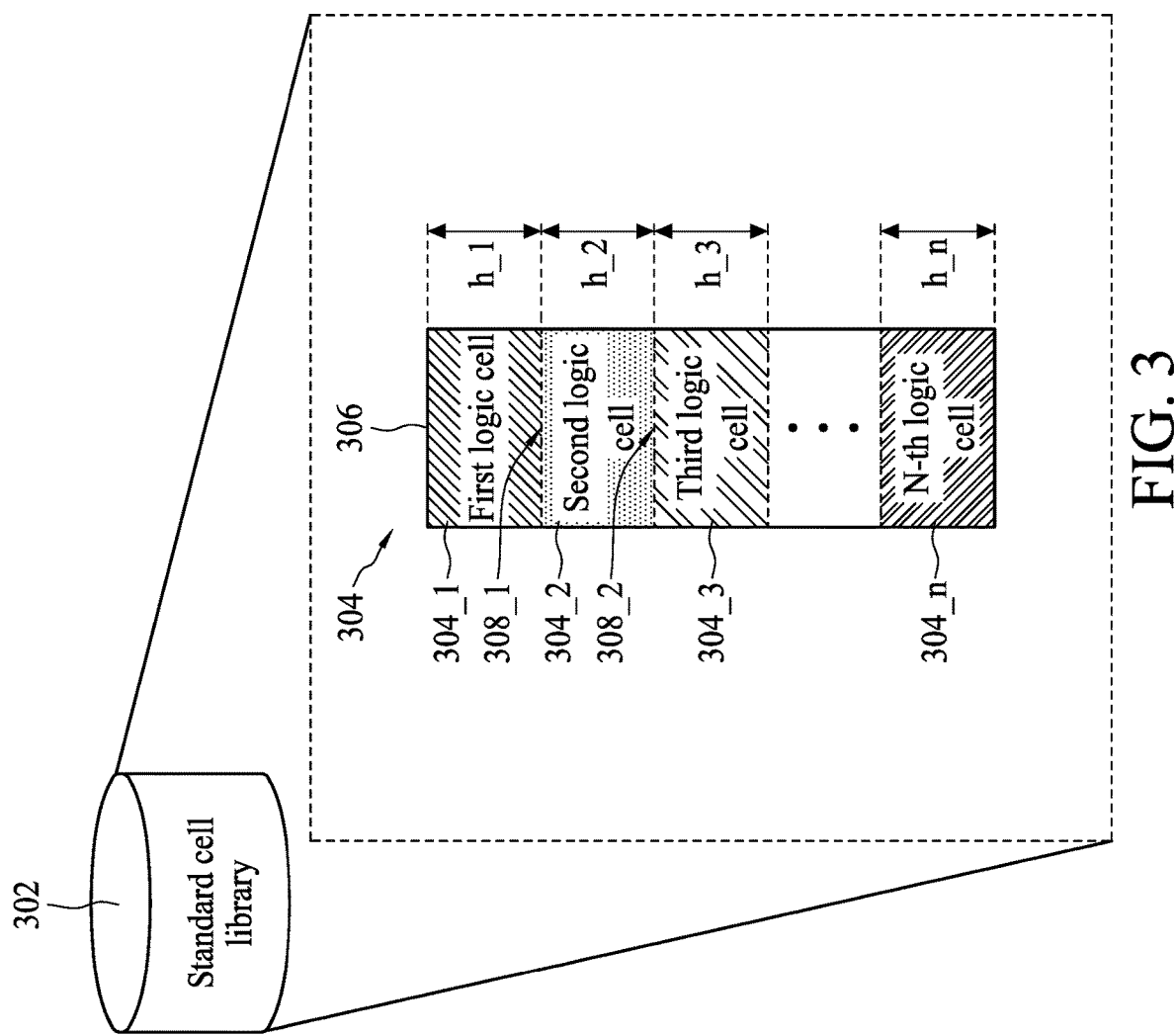
FIG. 3 is a diagram illustrating a standard cell library for storing a multi-bit standard cell applied in an APR process in accordance with some embodiments.

FIG. 3 is a diagram illustrating a standard cell library 302 for storing a multi-bit standard cell 304 applied in the APR process in accordance with some embodiments. The multi-bit standard cell library 302 is embodied on a non-transitory computer-readable medium or a non-transitory machine readable storage medium. In order to accommodate different driving capabilities, the multi-bit standard cell 304 comprises a plurality of logic cells $304\_1$-$304\_n$, wherein n may be any integer number greater than one. Therefore, the multi-bit standard cell 304 is an n-bit standard cell. The plurality of logic cells $304\_1$-$304\_n$ are arranged to have a plurality of logic cell heights $h\_1$-$h\_n$ respectively. The plurality of logic cells $304\_1$-$304\_n$ are configured to have the same logic function. For example, in one embodiment, each of the plurality of logic cells $304\_1$-$304\_n$ in the multi-bit standard cell 304 may be an inverter. In another embodiment, each of the plurality of logic cells $304\_1$-$304\_n$ may be an and-or-invert (AOI) gate. In another embodiment, each of the plurality of logic cells $304\_1$-$304\_n$ may be a NAND gate. In another embodiment, each of the plurality of logic cells $304\_1$-$304\_n$ may be a NOR gate. In addition, the logic cell heights $h\_1$-$h\_n$ may different with each other, or only some of the logic cell heights $h\_1$-$h\_n$ are different heights and the others are the same height. Moreover, the plurality of logic cells $304\_1$-$304\_n$ are arranged in a row (or column) and bounded within a bounding box 306. More specifically, the lower boundary $308\_1$ of the first logic cell $304\_1$ is attached to the upper boundary of the second logic cell $304\_2$, the lower boundary $308\_2$ of the second logic cell $304\_2$ is attached to the upper boundary of the third logic cell $304\_3$, and so on. A height (e.g. $h\_2$) of a logic cell (e.g. $304\_2$) may be measured from the lower boundary (e.g. $308\_2$) of the logic cell to the upper boundary (e.g. $308\_1$) of the logic cell. The height of a logic cell may be decided by the number of tracks (or fins) in a logic cell. For example, the height of a logic cell with seven tracks is smaller than the height of a logic cell with nine tracks. A track is typically referred to one contact pitch. A seven-track logic cell means that a transistor channel width in the logic cell is seven contact pitch wide. In other words, when the heights of two logic cells are different, the cell architectures of the two logic cells are also different. Therefore, the multi-bit standard cell 304 may have n different architectures for the plurality of logic cells $304\_1$-$304\_n$. It is noted that some logic cells in the plurality of logic cells $304\_1$-$304\_n$ in the multi-bit standard cell 304 may have the same architecture (i.e. the same height).

According to some embodiments, a plurality of the multi-bit standard cells 304 may be arranged to form a row or column, during the APR process (e.g. the above mentioned operations 208, 210, and/or 212), a consideration of larger driving capability requires taller logic cell(s) in a standard cell, while a consideration of low leakage and low power demands shorter logic cell(s) in the standard cell. Accordingly, the proposed mix row mega cell architecture may improve the balance of cell architecture and APR utilization by creating multi-bit logic cells using multiple cell architectures. The following paragraph describes the details of the proposed multi-bit standard cell 304.

Figure 4:
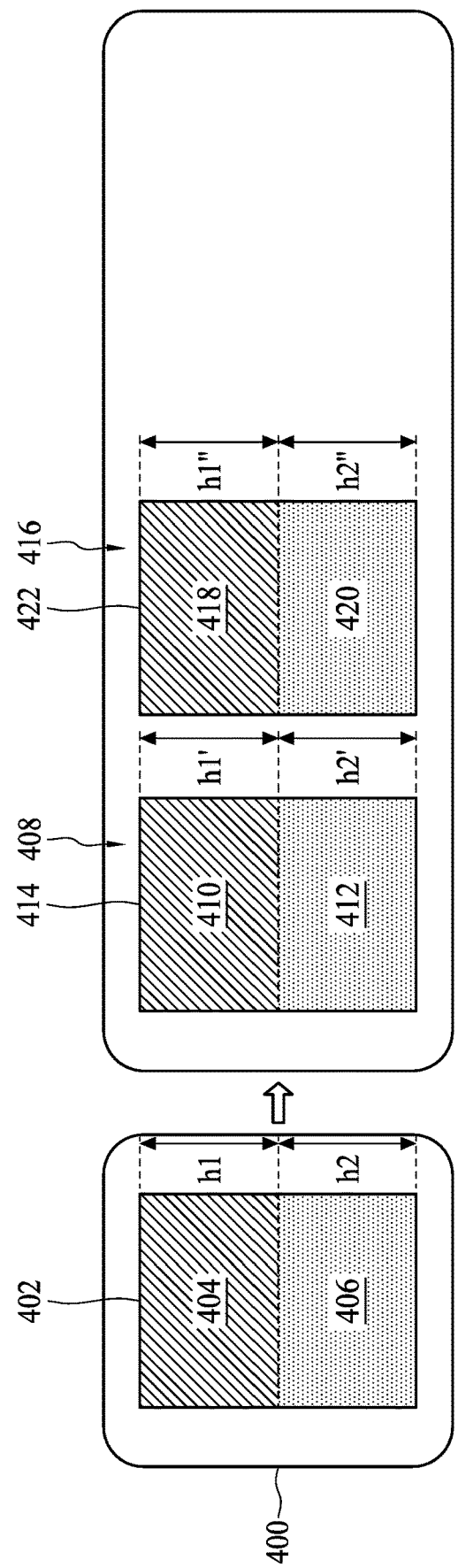
FIG. 4 is a diagram illustrating a multi-bit standard cell in accordance with some embodiments.

FIG. 4 is a diagram illustrating a multi-bit standard cell 400 in accordance with some embodiments. The multi-bit standard cell 400 is a multi-bit logic cell having two logic cells, i.e. n=2. According to some embodiments, the multi-bit standard cell 400 comprises a first logic cell 404, and a second logic cell 406. The first logic cell 404 and the second logic cell 406 are formed within a bounding box 402. A bounding box is a rectangular box defining the smallest area that encloses all of the geometry of circuit design of a standard cell. The first logic cell height h1 of the first logic cell 404 is measured from a lower boundary to an upper boundary of the first logic cell 404. The second logic cell height h2 of the second logic cell 406 is measured from a lower boundary to an upper boundary of the second logic cell 406. The second logic cell height h2 is different from the first logic cell height h1. Therefore, the cell architecture of the first logic cell 404 is different from the cell architecture of the second logic cell 406. Moreover, the upper boundary of the second logic cell 406 is attached to the lower boundary of the first logic cell 404. The height of the bounding box 402 is a total of the first logic cell height h1 and the second logic cell height h2. The first logic cell 404 is arranged to perform a first logical function, the second logic cell 406 is arranged to perform a second logical function, and the first logical function is the same as the second logical function.

For example, the multi-bit standard cell 400 may be a two-bit inverter 408. The two-bit inverter 408 comprises a first inverter 410 and a second inverter 412 bounded within a bounding box 414. The first inverter 410 and the second inverter 412 are one-bit logic gate. Therefore, the inverter 408 is two-bit inverter. The first inverter 410 and the second inverter 412 are configured to be different cell architectures (i.e. different heights). For example, the first logic cell height h1' of the first inverter 410 is greater than the second logic cell height h2' of the second inverter 412. Therefore, the second inverter 412 is the faster inverter in comparison to the first inverter 410.

In another example, the multi-bit standard cell 400 may be a two-bit and-or-invert (AOI) gate 416. The two-bit AOI 416 comprises a first AOI 418 and a second AOI 420 bounded within a bounding box 422. The first AOI 418 and the second AOI 420 are one-bit logic gate. Therefore, the AOI 416 is two-bit AOI. According to some embodiments, the first logic cell height h1" of the first AOI 418 is greater than the second logic cell height h2" of the second AOI 420.

Figure 5:
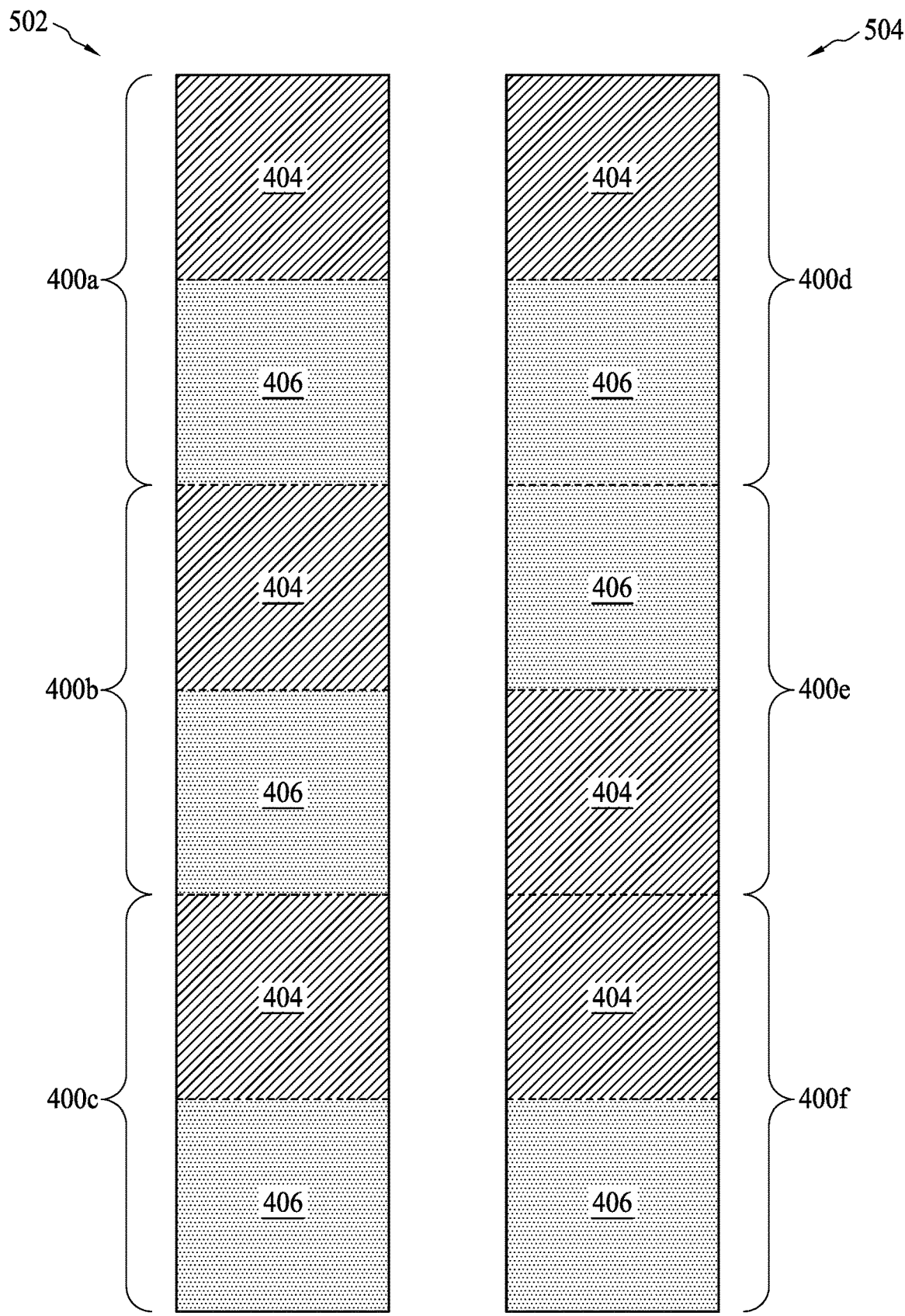
FIG. 5 is a diagram illustrating a first repeating pattern and a second repeating pattern of a multi-bit standard cell in accordance with some embodiments.

Moreover, during the APR process, the multi-bit standard cell 400 may be arranged as a repeating pattern to improve the overall APR utilization of the layout of the semiconductor circuit. FIG. 5 is a diagram illustrating a first repeating pattern 502 and a second repeating pattern 504 of the multi-bit standard cell 400 in accordance with some embodiments. The first repeating pattern 502 and the second repeating pattern 504 are macro-cells of the multi-bit standard cell 400. For the first repeating pattern 502, a plurality of multi-bit standard cells 400a-400c are repeatedly attached to form a row of multi-bit logic gate. Although three multi-bit standard cells 400a-400c are used in the first repeating pattern 502, this is not a limitation of the presented embodiment. The first repeating pattern 502 may be formed by any appropriate number of multi-bit standard cell 400. More specifically, in the first repeating pattern 502, the upper boundary of the first logic cell 404 in the second multi-bit standard cell 400b is attached to the lower boundary of the second logic cell 406 of the first multi-bit standard cell 400a, the upper boundary of the first logic cell 404 in the third multi-bit standard cell 400c is attached to the lower boundary of the second logic cell 406 of the second multi-bit standard cell 400b.

For the second repeating pattern 504, the plurality of multi-bit standard cells 400d-400f are repeatedly attached to form a row of multi-bit logic gate. Although three multi-bit standard cells 400d-400f are used in the second repeating pattern 504, this is not a limitation of the presented embodiment. The second repeating pattern 504 may be formed by any appropriate number of multi-bit standard cell 400. In comparison to the first repeating pattern 502, the positions of the first logic cells 404 and the second logic cells 406 in the every other multi-bit standard cell of the second repeating pattern 504 (i.e. the second, fourth, sixth, and . . . multi-bit standard cells in the second repeating pattern 504) are exchanged. More specifically, in the second repeating pattern 504, the upper boundary of the second logic cell 406 in the second multi-bit standard cell 400e is attached to the lower boundary of the second logic cell 406 of the first multi-bit standard cell 400d, the upper boundary of the first logic cell 404 in the second multi-bit standard cell 400e is attached to the lower boundary of the second logic cell 406 of the second multi-bit standard cell 400e, the upper boundary of the first logic cell 404 in the third multi-bit standard cell 400f is attached to the lower boundary of the first logic cell 404 of the second multi-bit standard cell 400e.

During the APR process, the EDA tool may connect the logic cells (e.g. the second logic cells 406) with faster cell architecture to speed critical paths, and connect the logic cells (e.g. the first logic cells 404) with slower cell architecture to high power path for power optimization. Accordingly, by using the first repeating pattern 502 and/or the second repeating pattern 504 during the APR process, the EDA tool may leverage speed and power optimization of the semiconductor circuit.

Figure 6:
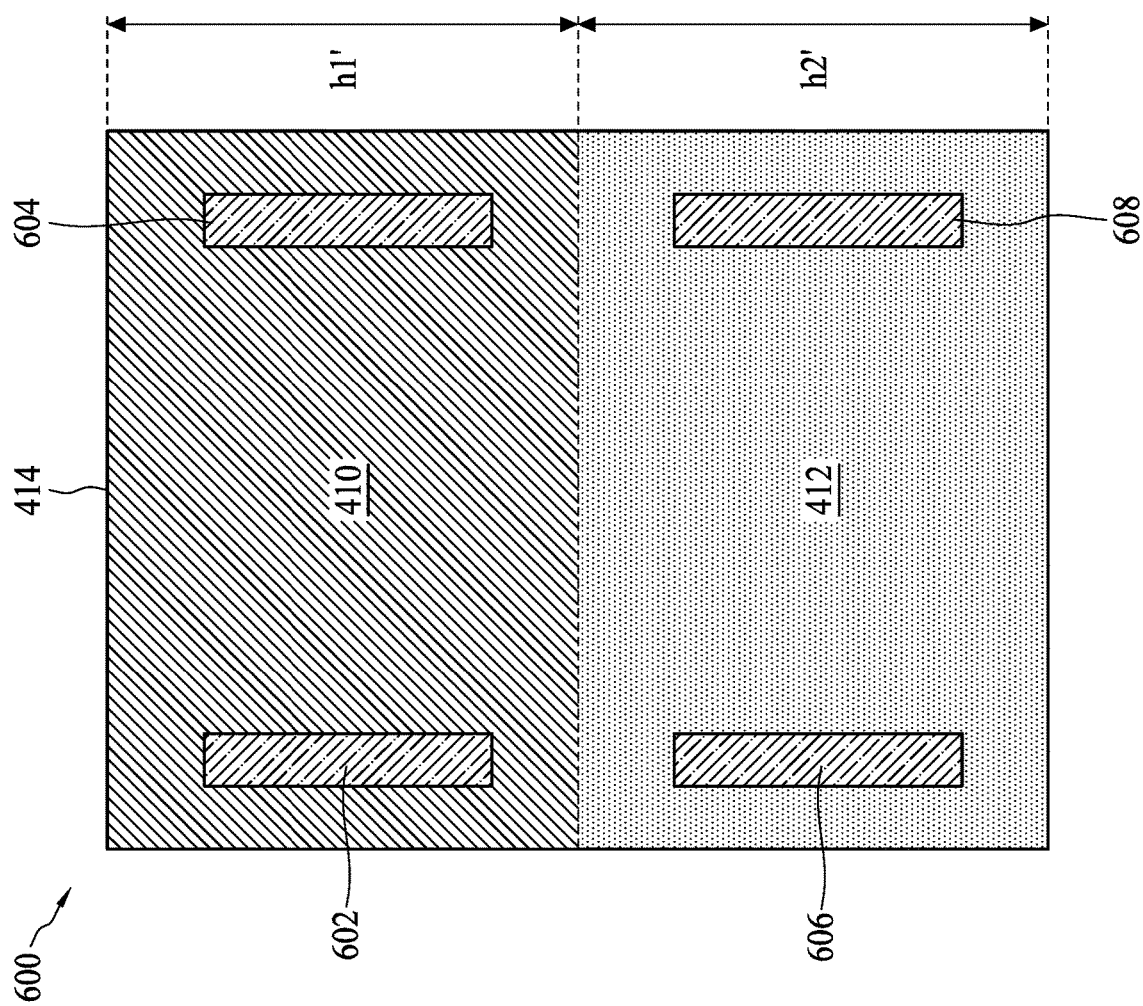
FIG. 6 is a diagram illustrating a simplified layout of a two-bit inverter in accordance with some embodiments.

FIG. 6 is a diagram illustrating a simplified layout 600 of the two-bit inverter 408 in accordance with some embodiments. The first inverter 410 comprises an input pin 602 and an output pin 604. The second inverter 412 comprises an input pin 606 and an output pin 608. According to some embodiments, the input pin 602 and the input pin 606 are two independent input pins, and the output pin 604 and the output pin 608 are two independent output pins. In other words, the first inverter 410 and the second inverter 412 are two independent inverters. Therefore, the timing path for each inverter or bit may be characterized separately and the EDA tool may optimize the semiconductor circuit by putting timing critical path in the faster cell architecture (i.e. the second inverter 412) and less timing critical path in power optimized cell architecture (i.e. the first inverter 410).

Figure 7:
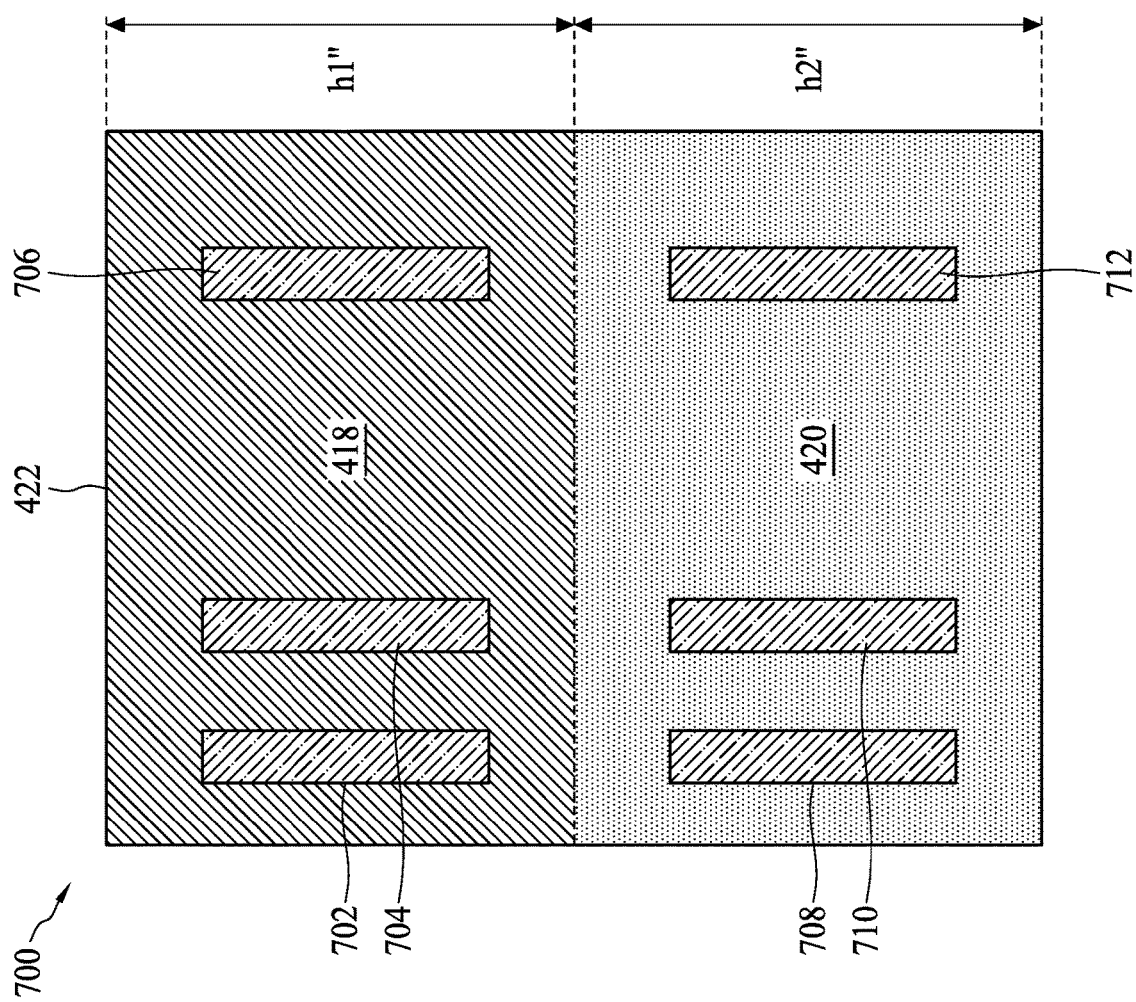
FIG. 7 is a diagram illustrating a simplified layout of a two-bit AOI gate in accordance with some embodiments.

FIG. 7 is a diagram illustrating a simplified layout 700 of the two-bit AOI gate 416 in accordance with some embodiments. The first AOI gate 418 comprises two input pins 702, 704, and an output pin 706. The second AOI gate 420 comprises two input pins 708, 710, and an output pin 712. The first AOI gate 418 may be a NOR gate. The second AOI gate 420 may be a NAND gate. According to some embodiments, the input pins 702, 704 and the input pins 708, 710 are two set of independent input pins, and the output pin 706 and the output pin 712 are two independent output pins. In other words, the first AOI gate 418 and the second AOI gate 420 are two independent logic gates. Therefore, the timing path for each AOI gate may be characterized separately and the EDA tool may optimize the semiconductor circuit by putting timing critical path in the faster cell architecture (i.e. the second AOI gate 420) and less timing critical path in power optimized cell architecture (i.e. the first inverter 418).

Figure 8:
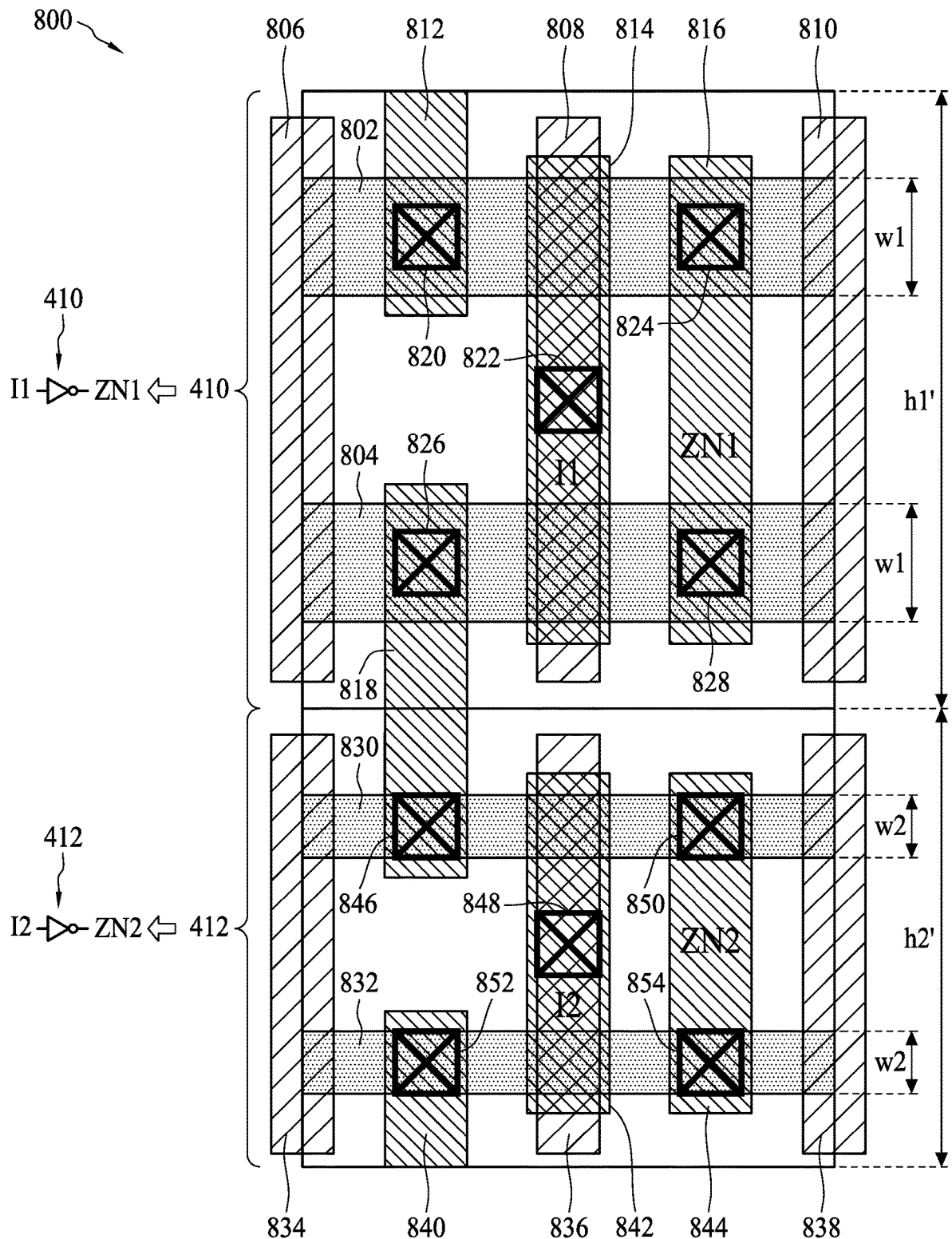
FIG. 8 is a diagram illustrating a layout of a two-bit inverter in accordance with some embodiments.

FIG. 8 is a diagram illustrating a layout 800 of the two-bit inverter 408 in accordance with some embodiments. The layout of the first inverter 410 comprises two oxide diffusion (OD) lines (or fins) 802, 804, three polysilicon lines 806, 808, 810, four metal lines 812, 814, 816, 818, and five contacts 820, 822, 824, 826, 828. The contact 820 is electrically connected between the OD line 802 and the metal line 812. The contact 822 is electrically connected between the polysilicon line 808 and the metal line 814. The contact 824 is electrically connected between the OD line 802 and the metal line 816. The contact 826 is electrically connected between the OD line 804 and the metal line 818. The contact 828 is electrically connected between the OD line 804 and the metal line 816. The metal line 812 is electrically connected to a supply voltage VDD. The metal line 818 is electrically connected to a ground voltage VSS. The metal line 814 is the input pin I1 of the first inverter 410. The metal line 816 is the output pin ZN1 of the first inverter 410. The equivalent circuit of the first inverter 410 is also shown on the upper left side of FIG. 8. According to some embodiments, the width of the OD line 802 as well as the OD line 804 is W1.

In addition, the layout of the second inverter 412 comprises two oxide diffusion (OD) lines (or fins) 830, 832, three polysilicon lines 834, 836, 838, four metal lines 818, 840, 842, 844, and five contacts 846, 848, 850, 852, 854. The contact 846 is electrically connected between the OD line 830 and the metal line 818. The contact 848 is electrically connected between the polysilicon line 836 and the metal line 842. The contact 850 is electrically connected between the OD line 830 and the metal line 844. The contact 852 is electrically connected between the OD line 832 and the metal line 840. The contact 854 is electrically connected between the OD line 832 and the metal line 844. The metal line 840 is electrically connected to a supply voltage VDD. The metal line 842 is the input pin I2 of the second inverter 412. The metal line 844 is the output pin ZN2 of the second inverter 412. The equivalent circuit of the second inverter 412 is also shown on the lower left side of FIG. 8. According to some embodiments, the width of the OD line 830 as well as the OD line 832 is W2.

According to some embodiments, the width W1 of the OD line 802 (or 804) is greater than the width W2 of the OD line 830 (or 832). Therefore, the corresponding logic cell height h1' of the first inverter 410 is greater than the corresponding logic cell height h2' of the second inverter 412. Therefore, the second inverter 412 is the faster inverter in comparison to the first inverter 410.

Figure 9:
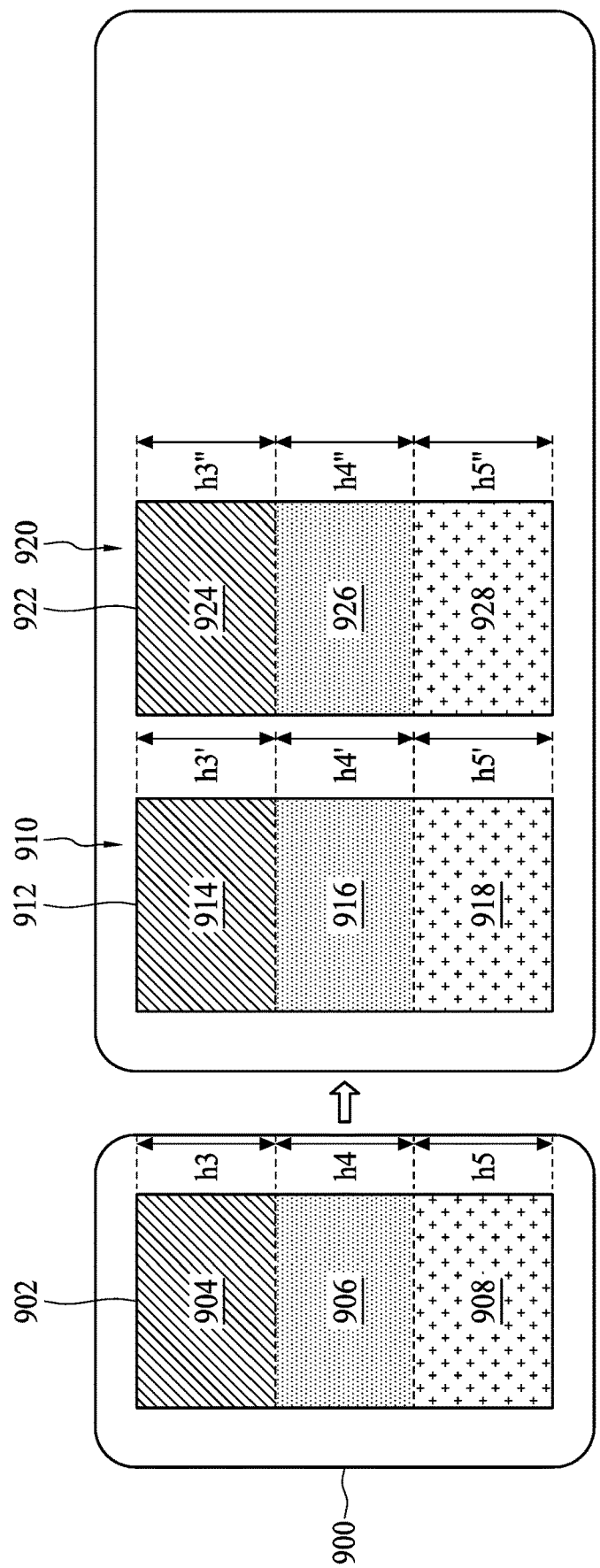
FIG. 9 is a diagram illustrating a multi-bit standard cell in accordance with some embodiments.

FIG. 9 is a diagram illustrating a multi-bit standard cell 900 in accordance with some embodiments. The multi-bit standard cell 900 has two logic cells, i.e. n=3. According to some embodiments, the multi-bit standard cell 900 comprises a first logic cell 904, a second logic cell 906, and a third logic cell 908. The first logic cell 904, the second logic cell 906, and the third logic cell 908 are formed within a bounding box 902. The logic cell heights of the logic cells 904, 906, and 908 are h3, h4, and h5 respectively. The logic cell heights h3, h4, and h5 are three different heights. Therefore, the cell architectures of the logic cells 904, 906, and 908 are different. Moreover, the upper boundary of the second logic cell 906 is attached to the lower boundary of the first logic cell 904. The upper boundary of the third logic cell 908 is attached to the lower boundary of the second logic cell 906. The height of the bounding box 902 is a total of the logic cell heights h3, h4, and h5. In addition, the logic cells 904, 906, and 908 are arranged to perform the same logical function.

For example, the multi-bit standard cell 900 may be a three-bit inverter 910. The three-bit inverter 910 comprises a first inverter 914, a second inverter 916, and a third inverter 918 bounded within a bounding box 912. Each of the inverters 914, 916, and 918 is a one-bit logic gate. Therefore, the inverter 910 is three-bit inverter. The inverters 914, 916, and 918 are configured to be different architectures (i.e. different heights). For example, the logic cell height h3' of the first inverter 914 is greater than the logic cell height h4' of the second inverter 916, and the logic cell height h4' of the second inverter 916 is greater than the logic cell height h5' of the third inverter 918. Therefore, the third inverter 918 is faster than the second inverter 916, and the second inverter 916 is faster than the first inverter 914.

In another example, the multi-bit standard cell 400 may be a three-bit AOI gate 920. The three-bit AOI gate 922 comprises a first AOI gate 924, a second AOI gate 926, and a third AOI gate 928 bounded within a bounding box 922. The first AOI gate 924, the second AOI gate 926, and the third AOI gate 928 are one-bit logic gate. Therefore, the AOI gate 920 is three-bit AOI gate. According to some embodiments, the logic cell height h3" of the first AOI gate 924 is greater than the logic cell height h4" of the second AOI gate 926, and the logic cell height h4" of the second AOI gate 926 is greater than the logic cell height h5" of the third AOI gate 928.

Figure 10:
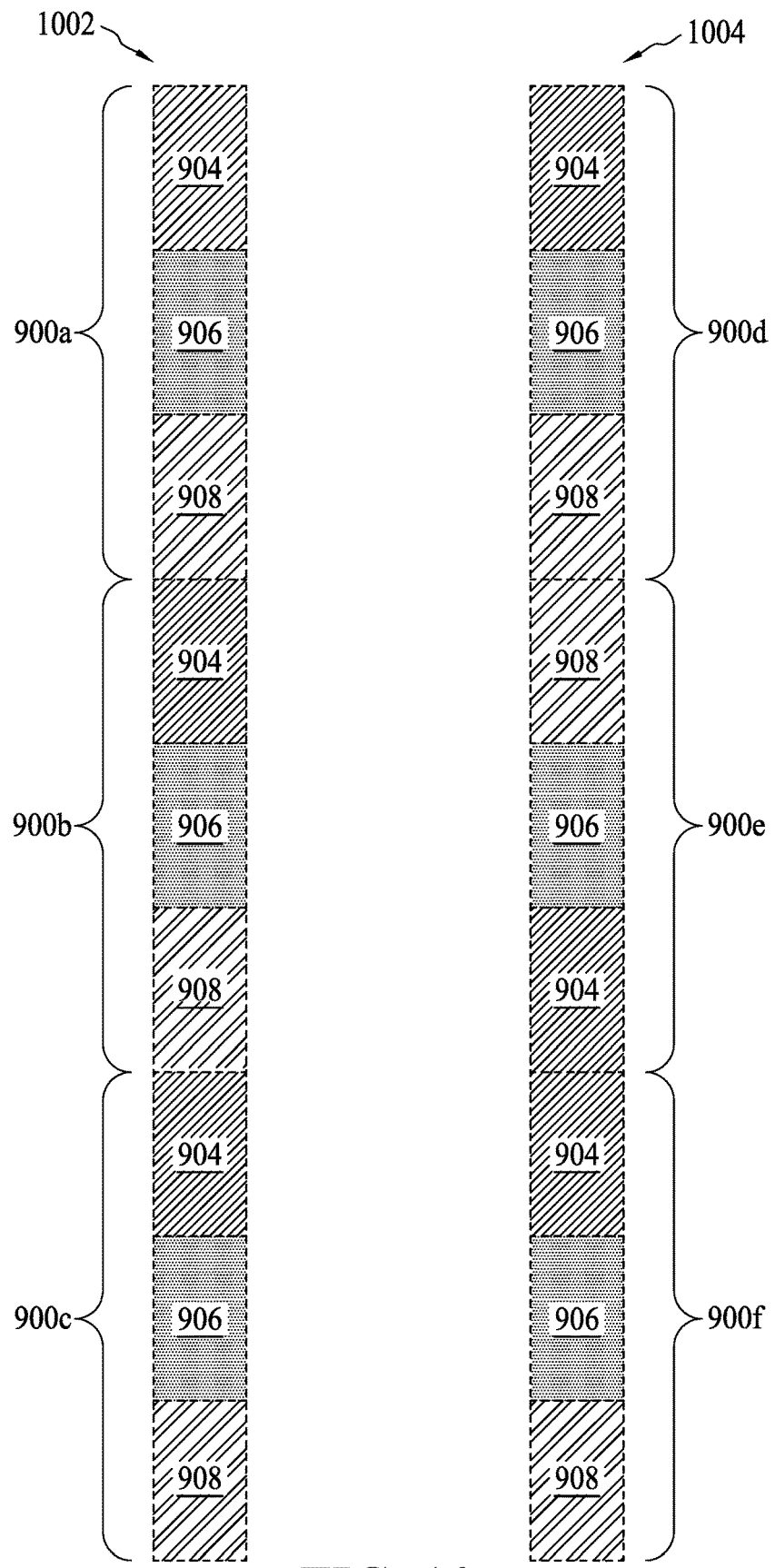
FIG. 10 is a diagram illustrating a first repeating pattern and a second repeating pattern of a multi-bit standard cell in accordance with some embodiments.

Moreover, during the APR process, the multi-bit standard cell 900 may be arranged as a repeating pattern to improve the overall APR utilization of the layout of the semiconductor circuit. FIG. 10 is a diagram illustrating a first repeating pattern 1002 and a second repeating pattern 1004 of the multi-bit standard cell 900 in accordance with some embodiments. The first repeating pattern 1002 and the second repeating pattern 1004 are macro-cells of the multi-bit standard cell 900. For the first repeating pattern 1002, a plurality of multi-bit standard cells 900a-900c are repeatedly attached to form a row of multi-bit logic gate. Although three multi-bit standard cells 900a-900c are used in the first repeating pattern 1002, this is not a limitation of the presented embodiment. The first repeating pattern 1002 may be formed by any appropriate number of multi-bit standard cell 900. More specifically, in the first repeating pattern 1002, the upper boundary of the first logic cell 904 in the second multi-bit standard cell 900b is attached to the lower boundary of the third logic cell 908 of the first multi-bit standard cell 900a, the upper boundary of the first logic cell 904 in the third multi-bit standard cell 900c is attached to the lower boundary of the third logic cell 908 of the second multi-bit standard cell 900b.

For the second repeating pattern 1004, the plurality of multi-bit standard cells 900d-900f are repeatedly attached to form a row of multi-bit logic gate. Although three multi-bit standard cells 900d-900f are used in the second repeating pattern 1004, this is not a limitation of the presented embodiment. The second repeating pattern 1004 may be formed by any appropriate number of multi-bit standard cell 900. In comparison to the first repeating pattern 1002, the positions of the first logic cells 904 and the third logic cells 908 in the every other multi-bit standard cell of the second repeating pattern 1004 (e.g. the second, fourth, sixth, and . . . multi-bit standard cells in the second repeating pattern 1004) are exchanged. More specifically, in the second repeating pattern 1004, the upper boundary of the third logic cell 908 in the second multi-bit standard cell 900e is attached to the lower boundary of the third logic cell 908 of the first multi-bit standard cell 900d, the upper boundary of the second logic cell 906 in the second multi-bit standard cell 900e is attached to the lower boundary of the third logic cell 908 of the second multi-bit standard cell 900e, the upper boundary of the first logic cell 904 in the second multi-bit standard cell 900e is attached to the lower boundary of the second logic cell 906 of the second multi-bit standard cell 900e, the upper boundary of the first logic cell 904 in the third multi-bit standard cell 900f is attached to the lower boundary of the first logic cell 904 of the second multi-bit standard cell 900e.

During the APR process, the EDA tool may connect the logic cells (e.g. the third logic cells 908) with faster cell architecture to speed critical paths, and connect the logic cells (e.g. the first logic cells 904) with slower cell architecture to high power path for power optimization. Accordingly, by using the first repeating pattern 1002 and/or the second repeating pattern 1004 during the APR process, the EDA tool may leverage speed and power optimization of the semiconductor circuit.

Figure 11:
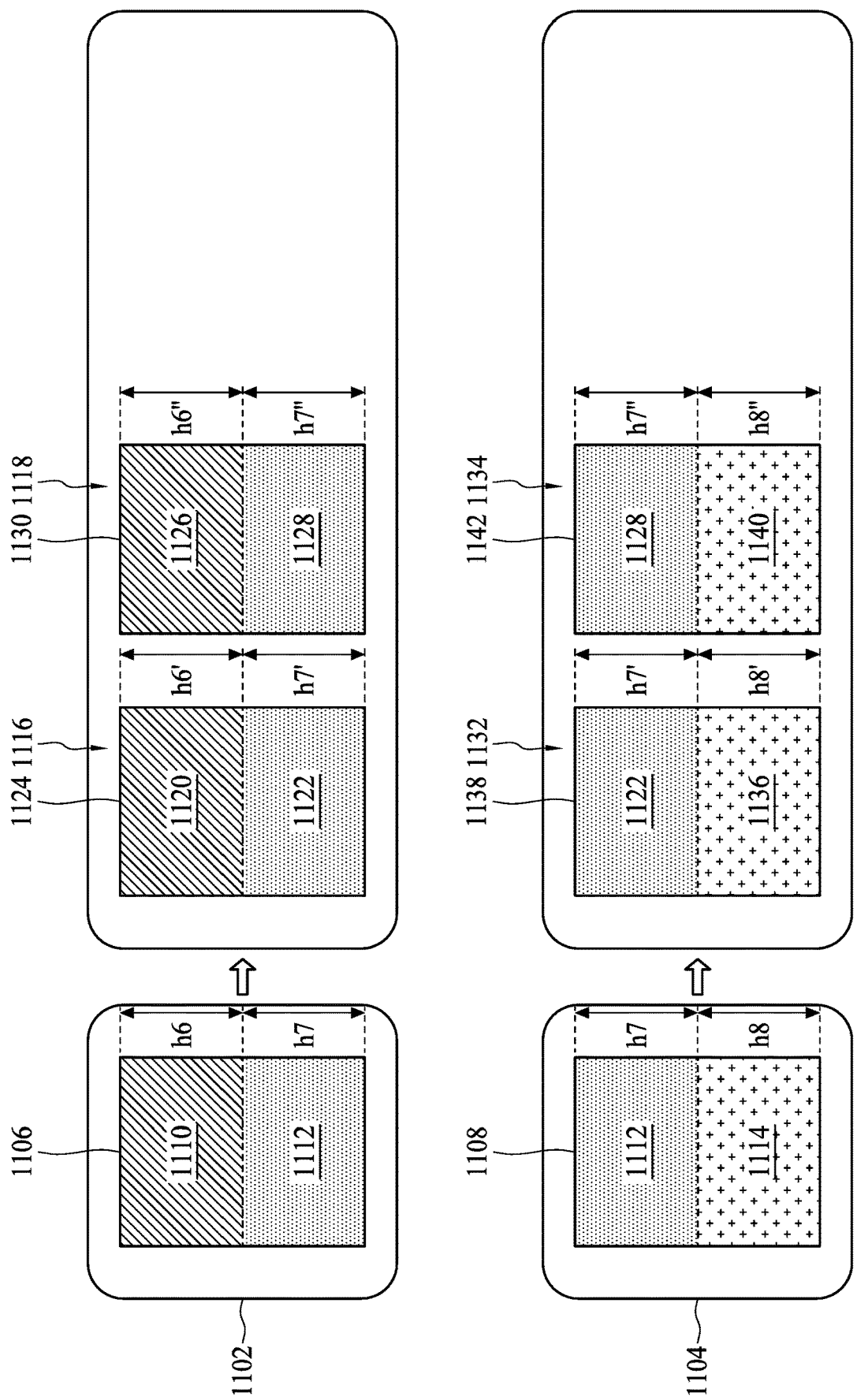
FIG. 11 is a diagram illustrating a first multi-bit standard cell and a second multi-bit standard cell in accordance with some embodiments.

FIG. 11 is a diagram illustrating a first multi-bit standard cell 1102 and a second multi-bit standard cell 1104 in accordance with some embodiments. Each of the first multi-bit standard cell 1102 and the second multi-bit standard cell 1104 has two logic cells, i.e. n=2.

According to some embodiments, the first multi-bit standard cell 1102 comprises a first logic cell 1110 and a second logic cell 1112. The first logic cell 1110 and the second logic cell 1112 are formed within a bounding box 1106. The logic cell heights of the logic cells 1110 and 1112 are h6 and h7 respectively. The logic cell height h7 is different from the logic cell height h6. Therefore, the cell architecture of the first logic cell 1110 is different from the cell architecture of the second logic cell 1112. Moreover, the upper boundary of the second logic cell 1112 is attached to the lower boundary of the first logic cell 1110. The first logic cell 1110 and the second logic cell 1112 are arranged to perform the same logical function. The multi-bit standard cell 1102 may be a two-bit inverter 1116 or a two-bit AOI gate 1118. The two-bit inverter 1116 comprises a first inverter 1120 with a logic cell height h6' and a second inverter 1122 with a logic cell height h7' bounded within a bounding box 1124. The two-bit AOI gate 1118 comprises a first AOI gate 1126 with a logic cell height h6" and a second AOI gate 1128 with a logic cell height h7" bounded within a bounding box 1130. The two-bit inverter 1116 and the two-bit AOI gate 1118 are similar to the two-bit inverter 408 and the two-bit AOI gate 416 respectively. Thus, the detailed description of the two-bit inverter 1116 and the two-bit AOI gate 1118 is omitted here for brevity.

The second multi-bit standard cell 1104 comprises the second logic cell 1112 and a third logic cell 1114. The second logic cell 1112 and the third logic cell 1114 are formed within a bounding box 1108. The logic cell height of the third logic cell 1114 is h8. The logic cell height h8 is different from the logic cell height h7. Therefore, the cell architecture of the third logic cell 1114 is different from the cell architecture of the second logic cell 1112. Moreover, the upper boundary of the third logic cell 1114 is attached to the lower boundary of the second logic cell 1112. The second logic cell 1112 and the third logic cell 1114 are arranged to perform the same logical function. The second multi-bit standard cell 1104 may be a two-bit inverter 1132 or a two-bit AOI gate 1134. The two-bit inverter 1132 comprises the inverter 1122 with the logic cell height h7' and an inverter 1136 with a logic cell height h8' bounded within a bounding box 1138. The two-bit AOI gate 1134 comprises the AOI gate 1128 with the logic cell height h7" and an AOI gate 1140 with a logic cell height h8" bounded within a bounding box 1142.

According to some embodiments, the logic cell height h8' is different from the logic cell heights h7' and h6'. Therefore, the inverters 1120, 1122, and 1136 have different architectures. In addition, the logic cell height h8" is different from the logic cell heights h7" and h6". Therefore, the AOI gates 1126, 1128, and 1140 have different architectures.

Figure 12:
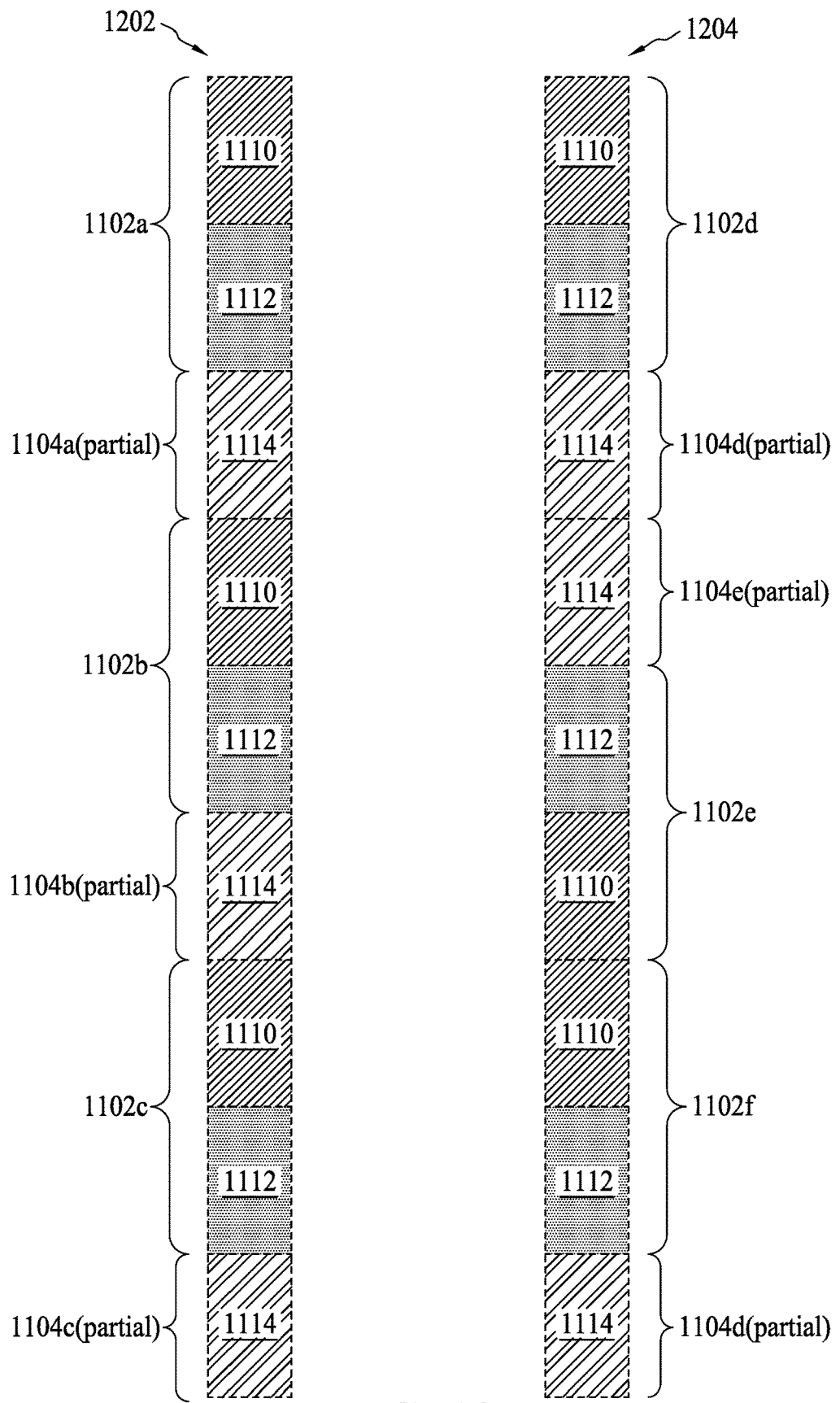
FIG. 12 is a diagram illustrating a first repeating pattern and a second repeating pattern of a first multi-bit standard cell and a second multi-bit standard cell in accordance with some embodiments.

During the APR process, a partial of the first multi-bit standard cell 1102 and/or a partial of the second multi-bit standard cell 1104 may be arranged as a repeating pattern to improve the overall APR utilization of the layout of the semiconductor circuit. FIG. 12 is a diagram illustrating a first repeating pattern 1202 and a second repeating pattern 1204 of the first multi-bit standard cell 1102 and the second multi-bit standard cell 1104 in accordance with some embodiments. The first repeating pattern 1202 and the second repeating pattern 1204 are macro-cells of the first multi-bit standard cell 1102 and the second multi-bit standard cell 1104. For the first repeating pattern 1202, a plurality of multi-bit standard cells 1102a-1102c and a plurality of partial multi-bit standard cells 1104a-1104c are alternatively attached to form a row of multi-bit logic gate. More specifically, in the first repeating pattern 1202, the upper boundary of the third logic cell 1114 in the partial multi-bit standard cell 1104a is attached to the lower boundary of the second logic cell 1112 of the multi-bit standard cell 1102a, the upper boundary of the first logic cell 1110 in the multi-bit standard cell 1102b is attached to the lower boundary of the third logic cell 1114 of the partial multi-bit standard cell 1104a, the upper boundary of the first logic cell 1110 in the multi-bit standard cell 1102b is attached to the lower boundary of the third logic cell 1114 of the partial multi-bit standard cell 1104a. The architectures of the multi-bit standard cells 1102b, 1102c, and the partial multi-bit standard cells 1104b, 1104c are similar to the architectures of the multi-bit standard cell 1102a and the partial multi-bit standard cell 1104a respectively, thus the detailed description is omitted here for brevity.

For the second repeating pattern 1204, the plurality of multi-bit standard cells 1102d-1102f and a plurality of partial multi-bit standard cells 1104d-1104f are alternatively attached to form a row of multi-bit logic gate. In comparison to the first repeating pattern 1202, the positions of the multi-bit standard cell 1102 and the partial multi-bit standard cell 1104 are exchanged in every combination of the multi-bit standard cells in the second repeating pattern 1204. More specifically, in the second repeating pattern 1204, the upper boundary of the third logic cell 1114 in the partial multi-bit standard cell 1104d is attached to the lower boundary of the second logic cell 1112 of the multi-bit standard cell 1102d, the upper boundary of the third logic cell 1114 in the partial multi-bit standard cell 1104e is attached to the lower boundary of the third logic cell 1114 of the partial multi-bit standard cell 1104d, the upper boundary of the second logic cell 1112 in the multi-bit standard cell 1102e is attached to the lower boundary of the third logic cell 1114 of the partial multi-bit standard cell 1104e, the upper boundary of the first logic cell 1110 in the multi-bit standard cell 1102e is attached to the lower boundary of the second logic cell 1112 of the multi-bit standard cell 1102e, the upper boundary of the first logic cell 1110 in the multi-bit standard cell 1102f is attached to the lower boundary of the first logic cell 1110 of the multi-bit standard cell 1102e. The architectures of the multi-bit standard cell 1102f and the partial multi-bit standard cell 1104f are similar to the architectures of the multi-bit standard cell 1102d and the partial multi-bit standard cell 1104d, thus the detailed description is omitted here for brevity.

During the APR process, the EDA tool may connect the logic cells (e.g. the third logic cells 1114) with faster cell architecture to speed critical paths, and connect the logic cells (e.g. the first logic cells 1110) with slower cell architecture to high power path for power optimization. Accordingly, by using the first repeating pattern 1202 and/or the second repeating pattern 1204 during the APR process, the EDA tool may leverage speed and power optimization of the semiconductor circuit.

Figure 13:
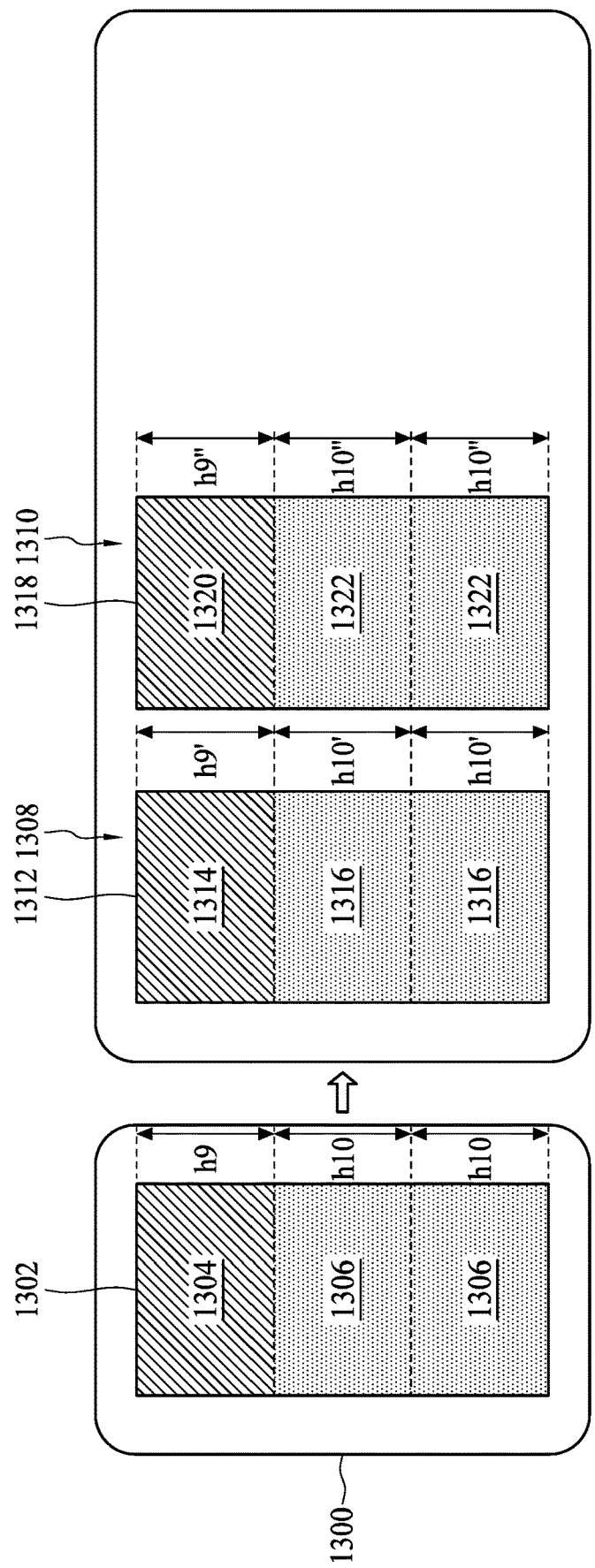
FIG. 13 is a diagram illustrating a multi-bit standard cell in accordance with some embodiments.

FIG. 13 is a diagram illustrating a multi-bit standard cell 1300 in accordance with some embodiments. The multi-bit standard cell 1300 has three logic cells, i.e. n=3. According to some embodiments, the multi-bit standard cell 1300 comprises a first logic cell 1304 and two similar logic cells 1306. The first logic cell 1304 and the two similar logic cells 1306 are formed within a bounding box 1302. The logic cell height of the first logic cell 1304 is h9, and the logic cell heights of the two similar logic cell 1306 are h10. The logic cell heights h9 and h10 are different values. Therefore, the cell architecture of the logic cell 1304 is different from the cell architectures of the logic cells 1306. The multi-bit standard cell 1300 has an uneven distribution of cell architectures in the bounding box 1302. The height of the bounding box 1302 is a total of the logic cell heights h9 and 2*h10. In addition, the logic cells 1304 and 1306 are arranged to perform the same logical function.

For example, the multi-bit standard cell 1300 may be a three-bit inverter 1308. The three-bit inverter 1308 comprises a first inverter 1314 and two similar inverter 1316 bounded within a bounding box 1312. Each of the inverters 1314 and 1316 is a one-bit logic gate. Therefore, the inverter 1308 is three-bit inverter. The logic cell height h9' of the first inverter 1314 is greater than the logic cell height h10' of the two similar inverters 1316. Therefore, the two similar inverters 1316 are faster than the first inverter 1314.

In another example, the multi-bit standard cell 1300 may be a three-bit AOI 1310. The three-bit AOI 1310 comprises a first AOI 1320 and two similar AOIs 1322 bounded within a bounding box 1318. The first AOI 1320 and the two similar third AOIs 1322 are one-bit logic gate. Therefore, the AOI 1310 is three-bit AOI. According to some embodiments, the logic cell height h9" of the first AOI 1320 is greater than the logic cell heights h10" of the two similar AOIs 1322.

Figure 14:
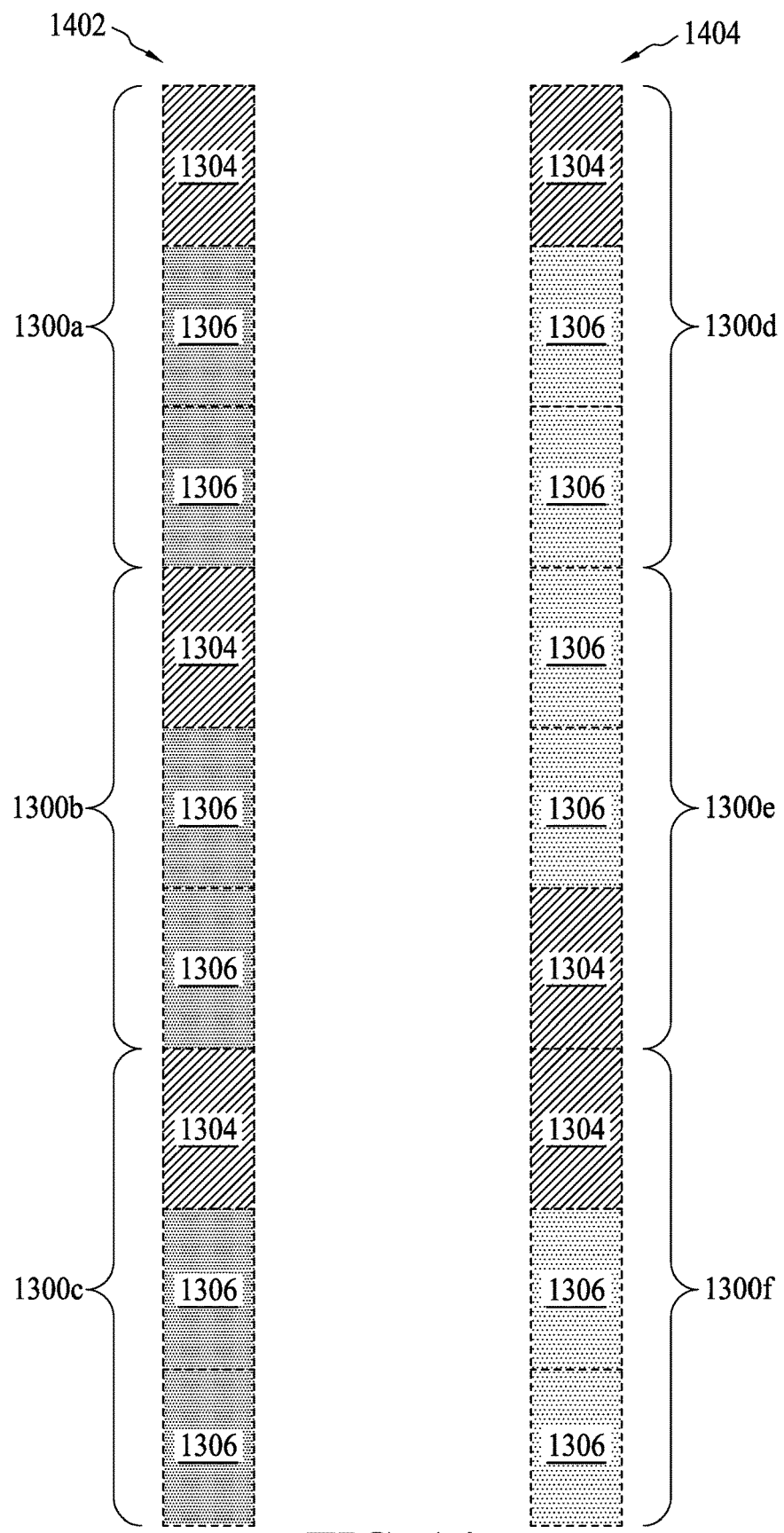
FIG. 14 is a diagram illustrating a first repeating pattern and a second repeating pattern of a multi-bit standard cell in accordance with some embodiments.

During the APR process, the multi-bit standard cell 1300 may be arranged as a repeating pattern to improve the overall APR utilization of the layout of the semiconductor circuit. FIG. 14 is a diagram illustrating a first repeating pattern 1402 and a second repeating pattern 1404 of the multi-bit standard cell 1300 in accordance with some embodiments. The first repeating pattern 1402 and the second repeating pattern 1404 are macro-cells of the multi-bit standard cell 1300. For the first repeating pattern 1402, a plurality of multi-bit standard cells 1300a-1300c are repeatedly attached to form a row of multi-bit logic gate. More specifically, in the first repeating pattern 1402, the upper boundary of the first logic cell 1304 in the second multi-bit standard cell 1300b is attached to the lower boundary of the third logic cell 1306 of the first multi-bit standard cell 1300a, the upper boundary of the first logic cell 1304 in the third multi-bit standard cell 1300c is attached to the lower boundary of the third logic cell 1306 of the second multi-bit standard cell 1200b.

For the second repeating pattern 1404, the plurality of multi-bit standard cells 1300d-1300f are repeatedly attached to form a row of multi-bit logic gate. In comparison to the first repeating pattern 1402, the positions of the first logic cells 1304 and the two similar logic cells 1306 in the every other multi-bit standard cell of the second repeating pattern 1404 (e.g. the second, fourth, sixth, and . . . multi-bit standard cells in the second repeating pattern 1404) are exchanged. More specifically, in the second repeating pattern 1404, the upper boundary of the third logic cell 1306 in the second multi-bit standard cell 1300e is attached to the lower boundary of the third logic cell 1306 of the first multi-bit standard cell 1300d, the upper boundary of the first logic cell 1304 in the second multi-bit standard cell 1300e is attached to the lower boundary of the second logic cell 1306 of the second multi-bit standard cell 1300e, the upper boundary of the first logic cell 1304 in the third multi-bit standard cell 1300f is attached to the lower boundary of the first logic cell 1304 of the second multi-bit standard cell 1300e.

During the APR process, the EDA tool may connect the logic cells (e.g. the logic cells 1306) with faster cell architecture to speed critical paths, and connect the logic cells (e.g. the first logic cells 1304) with slower cell architecture to high power path for power optimization. Accordingly, by using the first repeating pattern 1402 and/or the second repeating pattern 1404 during the APR process, the EDA tool may leverage speed and power optimization of the semiconductor circuit.

Briefly, the proposed embodiment provides a mix row mega cell architecture to improve the balance of cell architecture and APR utilization by creating multi-bit logic cells using multiple cell architectures. During the APR process, a consideration of larger driving capability requires taller logic cell(s) in the multi-bit logic cells, while a consideration of low leakage and low power demands shorter logic cell(s) in the multi-bit logic cells. By using the multi-bit logic cells, the EDA tool may better understand the cell utilization and avoid large displacement during APR optimization. Accordingly, the EDA tool may leverage speed and power optimization of the semiconductor circuit to balance the density of different cell architectures at cell level.

In some embodiments, the present disclosure provides a multi-bit standard cell. The multi-bit standard cell is embodied on a non-transitory computer-readable medium. The multi-bit standard cell comprises a first logic cell and a second logic cell. The first logic cell has a first logic cell height measured from a first lower boundary to a first upper boundary of the first logic cell. The second logic cell has a second logic cell height measured from a second lower boundary to a second upper boundary of the second logic cell. The second logic cell height different from the first logic cell height, and the second upper boundary attached to the first lower boundary. The first logic cell is arranged to perform a first logical function, the second logic cell is arranged to perform a second logical function, and the first logical function is the same as the second logical function.

In some embodiments, the present disclosure provides a macro-cell. The macro-cell is embodied on a non-transitory computer-readable medium. The macro-cell comprises a first multi-bit standard cell and a second multi-bit standard cell. The first multi-bit standard cell is arranged to perform a first logical function. The second multi-bit standard cell is coupled to the first multi-bit standard cell to form a row for performing a second logical function. The first logical function is the same as the second logical function.

In some embodiments, the present disclosure provides a multi-bit standard cell. The multi-bit standard cell is embodied on a non-transitory computer-readable medium. The multi-bit standard cell comprises a bounding box and a plurality of logic cells. The plurality of logic cells are arranged in a row and bounded within the bounding box. The plurality of logical functions are configured to perform a same logical function.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated circuit comprising a macro-cell, the macro-cell comprising:
    a first multi-bit standard cell, arranged to perform a first logical function; and
    a second multi-bit standard cell, coupled to the first multi-bit standard cell to form a row, for performing a second logical function,
    wherein the first logical function is the same as the second logical function.

2. The integrated circuit of claim 1, wherein the first multi-bit standard cell comprises:
    a first logic cell, with a first logic cell height; and
    a second logic cell, with a second logic cell height different from the first logic cell height, an upper boundary of the second logic cell attached to a lower boundary of the first logic cell; and
    the second multi-bit standard cell comprises:
    a third logic cell, with a third cell height; and
    a fourth logic cell, with a fourth cell height different from the third cell height, an upper boundary of the fourth logic cell attached to a lower boundary of the third logic cell,
    wherein an upper boundary of the third logic cell is coupled to a lower boundary of the second logic cell.

3. The integrated circuit of claim 2, wherein the first logic cell is the same as the third logic cell, and the second logic cell is the same as the fourth logic cell.

4. The integrated circuit of claim 2, wherein the first logic cell is the same as the fourth logic cell, and the second logic cell is the same as the third logic cell.

5. The integrated circuit of claim 2, wherein the first multi-bit standard cell further comprises:
    a fifth logic cell, with a fifth logic cell height, an upper boundary of the fifth logic cell attached to the lower boundary of the second logic cell, and a lower boundary of the fifth logic cell attached to the upper boundary of the third logic cell; and
    the second multi-bit standard cell further comprises:
    a sixth logic cell, with a sixth cell height, an upper boundary of the sixth logic cell attached to the lower boundary of the fourth logic cell.

6. The integrated circuit of claim 5, wherein the first logic cell is the same as the third logic cell, the second logic cell is the same as the fourth logic cell, and the fifth logic cell is the same as the sixth logic cell.

7. The integrated circuit of claim 5, wherein the first logic cell is the same as the third logic cell, and the second logic cell, the fourth logic cell, the fifth logic cell, and the sixth logic cell are the same logic cell.

8. The integrated circuit of claim 2, wherein the first multi-bit standard cell further comprises:
    a fifth logic cell, with a fifth logic cell height, an upper boundary of the fifth logic cell attached to the lower boundary of the second logic cell; and
    the second multi-bit standard cell further comprises:
    a sixth logic cell, with a sixth cell height, an upper boundary of the sixth logic cell attached to a lower boundary of the fifth logic cell, and a lower boundary of the sixth logic cell is attached to the upper boundary of the third logic cell.

9. The integrated circuit of claim 8, wherein the first logic cell is the same as the fourth logic cell, the second logic cell is the same as the third logic cell, and the fifth logic cell is the same as the sixth logic cell.

10. The integrated circuit of claim 8, wherein the first logic cell is the same as the fourth logic cell, and the second logic cell, the third logic cell, the fifth logic cell, and the sixth logic cell are the same logic cell.

11. A layout method, comprising:
    generating a layout including a macro-cell, the macro-cell comprising:
    a first multi-bit standard cell, arranged to perform a first logical function; and
    a second multi-bit standard cell, coupled to the first multi-bit standard cell to form a row, for performing a second logical function,
    wherein the first logical function is the same as the second logical function.

12. The layout method of claim 11, wherein the first multi-bit standard cell comprises:
    a first logic cell, with a first logic cell height; and
    a second logic cell, with a second logic cell height different from the first logic cell height, an upper boundary of the second logic cell attached to a lower boundary of the first logic cell; and
    the second multi-bit standard cell comprises:
    a third logic cell, with a third cell height; and
    a fourth logic cell, with a fourth cell height different from the third cell height, an upper boundary of the fourth logic cell attached to a lower boundary of the third logic cell,
    wherein an upper boundary of the third logic cell is coupled to a lower boundary of the second logic cell.

13. The layout method of claim 12, wherein the first logic cell is the same as the third logic cell, and the second logic cell is the same as the fourth logic cell.

14. The layout method of claim 12, wherein the first logic cell is the same as the fourth logic cell, and the second logic cell is the same as the third logic cell.

15. The layout method of claim 12, wherein the first multi-bit standard cell further comprises:
    a fifth logic cell, with a fifth logic cell height, an upper boundary of the fifth logic cell attached to the lower boundary of the second logic cell, and a lower boundary of the fifth logic cell attached to the upper boundary of the third logic cell; and
    the second multi-bit standard cell further comprises:
    a sixth logic cell, with a sixth cell height, an upper boundary of the sixth logic cell attached to the lower boundary of the fourth logic cell.

16. The layout method of claim 15, wherein the first logic cell is the same as the third logic cell, the second logic cell is the same as the fourth logic cell, and the fifth logic cell is the same as the sixth logic cell.

17. The layout method of claim 15, wherein the first logic cell is the same as the third logic cell, and the second logic cell, the fourth logic cell, the fifth logic cell, and the sixth logic cell are the same logic cell.

18. A system, comprising one or more processors and one or more programs including instructions which, when executed by the one or more processors, cause the system to generate a layout including a macro-cell, the macro-cell comprising:
- a first multi-bit standard cell, arranged to perform a first logical function; and
- a second multi-bit standard cell, coupled to the first multi-bit standard cell to form a row, for performing a second logical function,
- wherein the first logical function is the same as the second logical function.

19. The system of claim 18, wherein the first multi-bit standard cell comprises:
- a first logic cell, with a first logic cell height; and
- a second logic cell, with a second logic cell height different from the first logic cell height, an upper boundary of the second logic cell attached to a lower boundary of the first logic cell; and the second multi-bit standard cell comprises:
- a third logic cell, with a third cell height; and
- a fourth logic cell, with a fourth cell height different from the third cell height, an upper boundary of the fourth logic cell attached to a lower boundary of the third logic cell,
- wherein an upper boundary of the third logic cell is coupled to a lower boundary of the second logic cell.

20. The system of claim 19, wherein the first logic cell is the same as the third logic cell, and the second logic cell is the same as the fourth logic cell.

* * * * *